(12) United States Patent
Tanaka et al.

(10) Patent No.: US 7,814,811 B2
(45) Date of Patent: Oct. 19, 2010

(54) ARTICULATED ROBOT

(75) Inventors: Kentaro Tanaka, Kitakyushu (JP);
Satoshi Sueyoshi, Kitakyushu (JP); Eiji Tanaka, Kitakyushu (JP); Kouji Tsukuda, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 848 days.

(21) Appl. No.: 11/661,197

(22) PCT Filed: Aug. 22, 2005

(86) PCT No.: PCT/JP2005/015220

§ 371 (c)(1),
(2), (4) Date: Feb. 26, 2007

(87) PCT Pub. No.: WO2006/022231

PCT Pub. Date: Mar. 2, 2006

(65) Prior Publication Data

US 2009/0003983 A1    Jan. 1, 2009

(30) Foreign Application Priority Data

Aug. 25, 2004  (JP)  ............... 2004-245411

(51) Int. Cl.
*B25J 18/00*  (2006.01)
(52) U.S. Cl. .................. 74/490.01; 901/15
(58) Field of Classification Search .......... 74/490.01, 74/490.03–490.05; 901/15, 23; 414/744.3, 414/744.5, 917
See application file for complete search history.

(56) References Cited

U.S. PATENT DOCUMENTS

| | | | | |
|---|---|---|---|---|
| 6,478,531 | B1 * | 11/2002 | Yang | 414/744.3 |
| 7,056,080 | B2 * | 6/2006 | Ogawa et al. | 414/744.5 |
| 2002/0161481 | A1 * | 10/2002 | Uratani | 700/245 |

(Continued)

FOREIGN PATENT DOCUMENTS

JP     50-32654 A     3/1975

(Continued)

OTHER PUBLICATIONS

Japanese Office Action issued in Application No. 2006-531897; dated Jul. 20, 2010.

*Primary Examiner*—Richard W Ridley
*Assistant Examiner*—Terence Boes
(74) *Attorney, Agent, or Firm*—Sughrue Mion, PLLC (57) ABSTRACT

An articulated robot having a low lowest posture, a long up-down stroke, and such rigidity that the predetermined positional accuracy can be secured is provided.

It includes a first arm (42) which is rotatable about a first horizontal axis (43), a second arm (44) which is rotatable about a second horizontal axis (45) at the other end of the first arm (42), a third arm (46) which is rotatable about a third horizontal axis (47) at the other end of the second arm (44), an up-down table (48) which is rotatable about a fourth horizontal axis (49) at the other end of the third arm (46), a fourth arm which is rotatable about the first horizontal axis (43) and rotatable about the second horizontal axis (45) at its other end, a first parallel link mechanism (53), a second parallel link mechanism (56), and a third parallel link mechanism (58).

11 Claims, 8 Drawing Sheets

U.S. PATENT DOCUMENTS

2004/0131461 A1 * 7/2004 Momoki .................. 414/744.5

FOREIGN PATENT DOCUMENTS

| JP | 50-12860 | Y | 4/1975 |
| JP | 63-007286 | A | 1/1988 |
| JP | 06-262554 | A | 9/1994 |
| JP | 7-148684 | A | 6/1995 |
| JP | 7-328982 | A | 12/1995 |
| JP | 11-123675 | A | 5/1999 |
| JP | 2000-024966 | A | 1/2000 |
| JP | 2001-239482 | A | 9/2001 |
| JP | 2002-210684 | A | 7/2002 |
| JP | 2002-326181 | A | 11/2002 |
| JP | 2002-326182 | A | 11/2002 |
| JP | 2001-217298 | A | 8/2010 |

* cited by examiner

ARTICULATED ROBOT

TECHNICAL FIELD

The present invention relates to an articulated robot, particularly, to an articulated robot which realizes a long up-down stroke by a vertical operation mechanism.

BACKGROUND ART

A robot has been known in which a vertical operation mechanism and a horizontal mechanism are combined in order to move a work such as a large-sized liquid crystal substrate up-down or horizontally, and the vertical operation mechanism takes charge of the up-down operation and the horizontal operation mechanism takes charge of the horizontal operation (For example, Patent Document 1, Patent Document 2, and Patent Document 3).
Patent Document 1: JP-A-2000-24966
Patent Document 2: JP-A-2002-326182
Patent Document 3: JP-A-11-123675

DISCLOSURE OF THE INVENTION

Problems to be Solved by the Invention

In recent years, a low lowest posture and a long up-down stroke are required for such industrial robots. However, if a robot described in the Patent Document 1 or the Patent Document 2 is simply enlarged, there is a problem that an arm length becomes so long that the long arm extends horizontally and takes space when the robot is in a lowest posture.

Further, there is a problem that rigidity cannot be secured only by simply increasing the number of articulations, so that positional accuracy is not secured.

Furthermore, since a robot described in the Patent Document 3 is a linear motion type, there is a problem that a long linear motion mechanism is required in order to ensure a long up-down stroke, thereby causing an increase in height from an installation surface even when the robot is in the lowest posture.

The invention has been made in view of such problems, and an object thereof is to provide an industrial robot having a low lowest posture and a long up-down stroke, enabling to save an installation space, and also having such rigidity that a predetermined positional accuracy can be ensured.

Means for Solving the Problems

In order to solve the above problems, the present invention is constructed as follows.

According to a first aspect of the invention, an articulated robot includes: a base; a first arm having one end supported by the base so as to be rotatable about a first horizontal axis; a second arm having one end supported by the other end of the first arm so as to be rotatable about a second horizontal axis that is parallel to the first horizontal axis; a third arm having one end supported by the other end of the second arm so as to be rotatable about a third horizontal axis that is parallel to the first horizontal axis; an up-down table supported by the other end of the third arm so as to be rotatable about a fourth horizontal axis that is parallel to the first horizontal axis; a fourth arm having one end supported by the base so as to be rotatable about the first horizontal axis; a fifth arm having one end supported by the fourth arm so as to be rotatable about a fifth horizontal axis that is parallel to the first horizontal axis, and the other end supported by the second arm so as to be rotatable about a sixth horizontal axis that is parallel to the first horizontal axis; a first link base which is rotatably supported by the second horizontal axis; a second link base which is rotatably supported by the third horizontal axis; a first auxiliary link which is rotatably supported by the base and the first link base, and forms a first parallel link mechanism with the first link base, the first arm and the base; a second auxiliary link which is rotatably supported by the first link base and the second link base, and forms a second parallel link mechanism with the second link base, the second arm and the first link base; and a third auxiliary link which is rotatably supported by the second link base and the up-down table, and forms a third parallel link mechanism together with the up-down table, the third arm and the second link base, wherein a length ratio between the first arm, the second arm, the third arm, the fourth arm, and the fifth arm is 1:2:1:1:1, and the sixth horizontal axis is disposed in a middle between the second horizontal axis and the third horizontal axis.

According to a second aspect of the invention, the articulated robot set forth in the first aspect of the invention further includes: a first motor attached to the second arm, the first motor rotating the third arm relative to the second arm via a first speed reducer; and a second motor attached to the fourth arm, the second motor rotating the fifth arm relative to the fourth arm via a second speed reducer, and further rotating the fourth arm relative to the base via coupling means provided in the fourth arm and via a third speed reducer.

According to a third aspect of the invention, an articulated robot includes: a base; a first arm having one end supported by the base so as to be rotatable about a first horizontal axis; a second arm having one end supported by the other end of the first arm so as to be rotatable about a second horizontal axis that is parallel to the first horizontal axis; a third arm having one end supported by the other end of the second arm so as to be rotatable about a third horizontal axis that is parallel to the first horizontal axis; an up-down table supported by the other end of the third arm so as to be rotatable about a fourth horizontal axis that is parallel to the first horizontal axis; a fourth arm having one end supported by the base so as to be rotatable about the first horizontal axis, the fourth arm and the first arm supporting the second arm from respective sides around the second horizontal axis; a first link base which is rotatably supported by the second horizontal axis; a second link base which is rotatably supported by the third horizontal axis; a first auxiliary link which is rotatably supported by the base and the first link base, and forms a first parallel link mechanism with the first link base, the first arm and the base; a second auxiliary link which is rotatably supported by the first link base and the second link base, and forms a second parallel link mechanism with the second link base, the second arm and the first link base; and a third auxiliary link which is rotatably supported by the second link base and the up-down table, and forms a third parallel link mechanism with the up-down table, the third arm and the second link base.

According to a fourth aspect of the invention, the articulated robot set forth in the third aspect of the invention further includes a first motor and a second motor attached to the second arm, wherein the first motor rotates the second arm relative to the first arm via a first speed reducer, rotates the second arm relative to the fourth arm via a second speed reducer, rotates the first arm relative to the base via a first coupling unit provided in the first arm and via a third speed reducer, and rotates the fourth arm relative to the base via a second coupling unit provided in the fourth arm and via a fourth speed reducer, and the second motor rotates the third arm relative to the second arm via a fifth speed reducer.

According to a fifth aspect of the invention, the articulated robot set forth in first or third aspect of the invention further includes an auxiliary arm having one end supported by the first arm so as to be rotatable about the second horizontal axis and the other end supported by the third arm so as to be rotatable about the third horizontal axis, wherein the auxiliary arm and the second arm support the third arm from respective sides.

According to a sixth aspect of the invention, in the articulated robot set forth in the fifth aspect of the invention, the inside of the auxiliary arm is hollow so as to be a path of a cable.

According to a seventh aspect of the invention, the articulated robot set forth in first or third aspect of the invention further includes a horizontal articulated arm attached to the up-down table.

According to an eighth aspect of the invention, the articulated robot set forth in first or third aspect of the invention further includes two motors which are independently operable and are mounted along an up-down axis, and a control device which corrects the numbers of revolutions of the two motors with a previously set constant according to rigidity of the arms so that a cooperative operation of linearly moving up-down is made possible.

EFFECT OF THE INVENTION

According to the present invention, since the up-down mechanism is constituted by the vertical articulated mechanism including the three parallel link mechanisms, a low lowest posture and a long up-down stroke are obtained. Further, there is an advantage that a dimension in the lowest posture can be reduced and the installation area can be reduced.

Further, since the arm is supported from both sides, the rigidity increases so that there is an advantage that the stable conveying posture and an accurate positioning are possible.

Further, since the two motors in the up-down mechanism are respectively independent, there is an advantage that more accurate vertical operation can be performed by adjusting the number of revolutions of each motor.

DESCRIPTION OF REFERENCE NUMERALS

1 Base
2 First arm
3 First horizontal axis
4 Second arm
5 Second horizontal axis
6 Third arm
7 Third horizontal axis
8 Up-down table
9 Fourth horizontal axis
10 Fourth arm
11 Fifth arm
12 Fifth horizontal axis
13 Sixth horizontal axis
14 First link base
15 First auxiliary link
16 First parallel link mechanism
17 Second link base
18 Second auxiliary link
19 Second parallel link mechanism
20 Third auxiliary link
21 Third parallel link mechanism
22 Auxiliary arm
23 First motor
24 First speed reducer
25 Second motor
26 Second speed reducer
27 Coupling unit
28 Third speed reducer
29 Horizontal articulated mechanism
30 Vertical axis
31 Rotation base
32 Horizontal arm
33 Base
34 First arm
35 First horizontal axis
36 Second arm
37 Second horizontal axis
38 Third arm
39 Third horizontal axis
41 Base
42 First arm
43 First horizontal axis
44 Second arm
45 Second horizontal axis
46 Third arm
47 Third horizontal axis
48 Up-down table
49 Fourth horizontal axis
50 Fourth arm
51 First link base
52 First auxiliary link
53 First parallel link mechanism
54 Second link base
55 Second auxiliary link
56 Second parallel link mechanism
57 Third auxiliary link
58 Third parallel link mechanism
59 Horizontal articulated mechanism
60 Auxiliary arm
61 First motor
62 First speed reducer
63 Second motor
64 Coupling unit
65 Shaft
66 Second speed reducer
67 Third speed reducer
68 Coupling unit
69 Fourth speed reducer 70 Coupling unit
71 Fifth speed reducer

BEST MODE FOR CARRYING OUT THE INVENTION

Embodiments of the invention will be described below with reference to the drawings.

Embodiment 1

Figure 1:
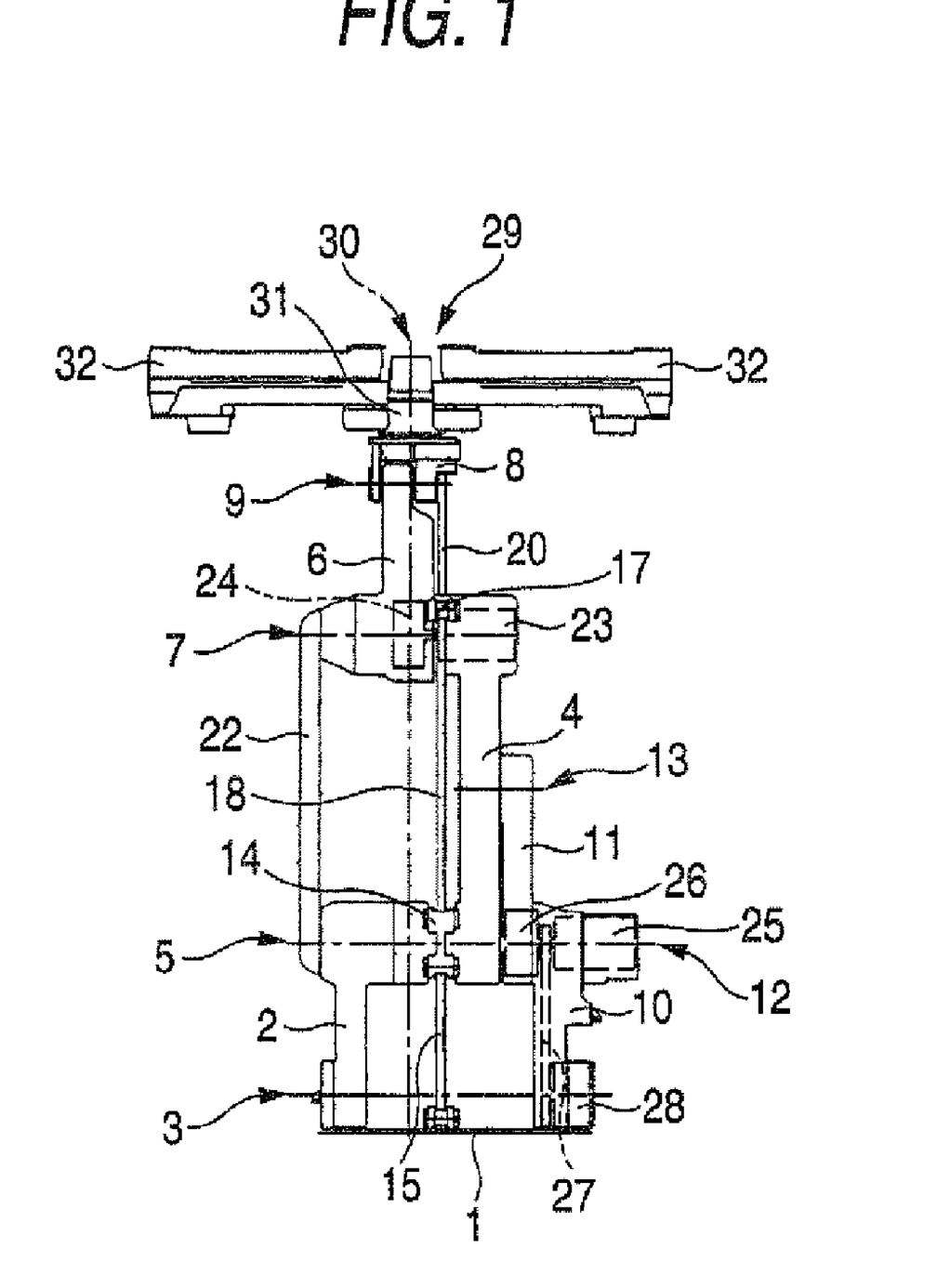
FIG. 1 It is a front view of an articulated robot showing a first embodiment of the invention.
Figure 2:
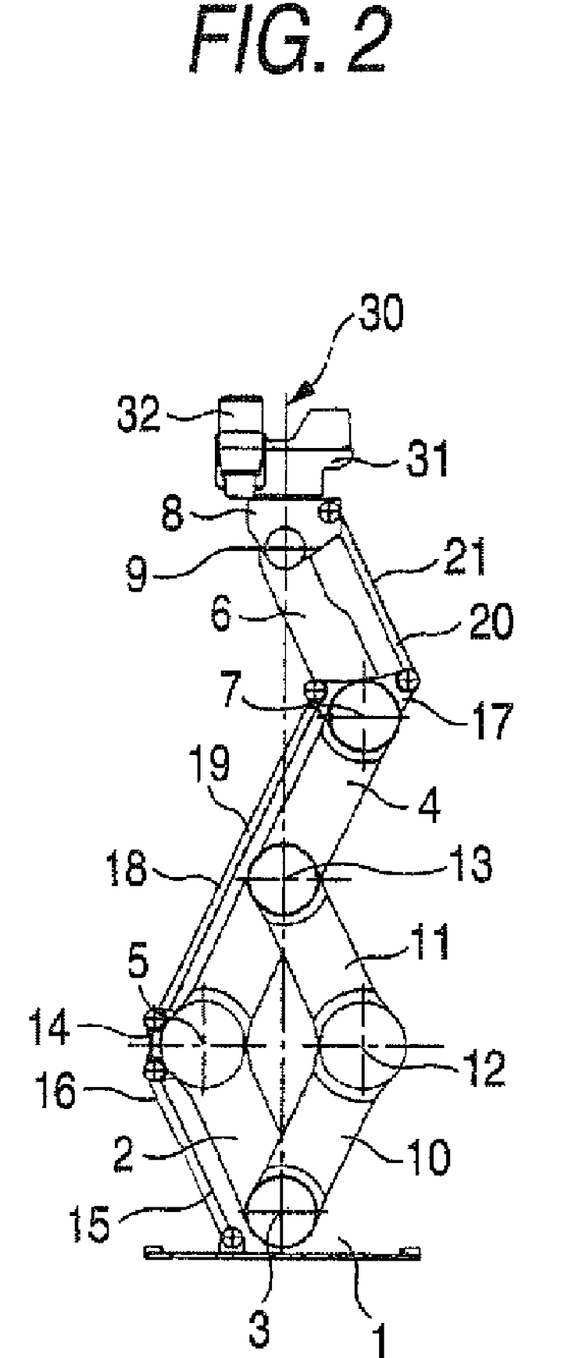
FIG. 2 It is a side view of the articulated robot showing the first embodiment of the invention.

FIGS. 1 and 2 are outline views of an articulated robot showing a first embodiment of the invention, in which FIG. 1 is a front view and FIG. 2 is a side view.

In both figures, 1 is a base of an articulated robot. 2 is a first arm, a lower end thereof is attached so as to be rotatable about a first horizontal axis 3 which is fixed to the base 1, and a leading end thereof supports a second arm 4.

4 is the second arm, a lower end thereof is attached so as to be rotatable about a second horizontal axis 5 which is fixed to the leading end of the first arm 2, and a leading end thereof supports a third arm 6.

6 is the third arm, a lower end thereof is attached so as to be rotatable about a third horizontal axis 7 which is fixed to the leading end of the second arm 4, and a leading end thereof supports an up-down table 8.

8 is the up-down table, and is attached so as to be rotatable about a forth horizontal axis 9 which is fixed to the leading end of the third arm 6.

On the other hand, 10 is a fourth arm, a lower end thereof is attached so as to be rotatable about the first horizontal axis 3 which is fixed to the base 1, and a leading end thereof supports a fifth arm 11.

11 is the fifth arm, a lower end thereof is attached so as to be rotatable about a fifth horizontal axis 12 which fixed to the leading end of the fourth arm 10, and a leading end thereof is supported so as to be rotatable about a sixth horizontal axis 13 which is fixed in the center of the second arm 4.

Here, the first horizontal axis 3, the second horizontal axis 5, the third horizontal axis 7, the fourth horizontal axis 9, the fifth horizontal axis 12, and the sixth horizontal axis 13 are all parallel, and a length ratio between the first arm 2, the second arm 4, the third arm 6, the fourth arm 10, and the fifth arm 11 is 1:2:1:1:1.

14 is a first link base which is rotatably supported by the second horizontal axis 5.

15 is a first auxiliary link, each end of which is rotatably supported by the base 1 and the first link base 14 respectively.

The first auxiliary link 15 forms a first parallel link mechanism 16 with the first link base 14, the first arm 2, and the base 1.

17 is a second link base which is rotatably supported by the third horizontal axis 7.

18 is a second auxiliary link, each end of which is rotatably supported by the first link base 14 and the second link base 17 respectively.

The second auxiliary link 18 forms a second parallel link mechanism 19 with the second link base 17, the second arm 4, and the first link base 14.

20 is a third auxiliary link, each end of which is rotatably supported by the second link base 17 and the up-down table 8 respectively.

The third auxiliary link 20 forms a third parallel link mechanism 21 with the up-down table 8, the third arm 6, and the second link base 17.

The attitude of the up-down table 8 is kept horizontal by the first parallel link mechanism 16, the second parallel link mechanism 19, and the third parallel link mechanism 21.

22 (FIG. 1) is an auxiliary arm having a lower end attached so as to be rotatable about the second horizontal axis 5 which is fixed to the upper end of the first arm 2, and a upper end attached so as to be rotatable about the third horizontal axis 7 which is fixed to the lower end of the third arm 6. The auxiliary arm 22 and the second arm 4 support the third arm 6 from respective sides. Further, the inside of the auxiliary arm 22 is hollow, and is used as a path for a cable extending from the base 1 to the up-down table 8.

23 is a first motor which is fixed to the second arm 4. The first motor 23 drives the third arm 6 via a first speed reducer 24 and rotates the third arm 6 relative to the second arm 4.

25 is a second motor which is fixed to the fourth arm 10. The second motor 25 drives the fifth arm 11 via a second speed reducer 26, rotates the fifth arm 11 relative to the fourth arm 10, and rotates the fourth arm 10 relative to the base 1 via coupling means 27 (although a belt-pulley mechanism is used here, a shaft and gears may be used in combination) provided in the fourth arm 10 and a third speed reducer 28.

The first motor 23 and the second motor 25 are operated by a not-shown control device independently or cooperatively.

In this way, the first arm 2, the second arm 4, the third arm 6, the fourth arm 10, and the fifth arm 11 rotate relatively, thereby moving the up-down table 18 up and down. At this time, a rotation ratio between the first speed reducer 24, the second speed reducer 26, and the third speed reducer 28 is 2:2:1 in theory. However, in case where rigidity of the arms is low, the up-down table 8 may not operate vertically due to deformation of the arms. Even in such a case, the up-down table 8 can be operated vertically with accuracy by adjusting the numbers of revolutions (or a revolution ratio) of the first motor 23 and the second motor 25 by the not-shown control device.

Next, an up-down operation of the articulated robot according to the first embodiment will be described.

(Up-Operation)

When the second motor 25 (FIG. 1) is rotated in a state shown in FIGS. 1 and 2, the fifth arm 11 is rotated clockwise in FIG. 2 via the second speed reducer 26, and the fourth arm 10 is rotated in the reverse direction via the coupling means 27 and the third speed reducer 28, whereby a diamond shape formed by the first arm 2, a half length of the second arm 4, the fourth arm 10 and the fifth arm 11 expands in the up-down direction. When the first motor 23 is further rotated so as to drive the third arm 6 clockwise via the first speed reducer 24, whereby the first parallel link mechanism 16, the second parallel link mechanism 19, as well as the third parallel link mechanism 21 extend in the up-down direction respectively. At this time, the up-down table 8 moves up vertically while keeping the horizontal state by setting the revolution ratio between the first speed reducer 24, the second speed reducer 26, and the third speed reducer 28 to 2:2:1.

(Down-Operation)

When the second motor 25 (FIG. 1) is rotated reversely in the state shown in FIGS. 1 and 2, the fifth arm 11 is rotated counterclockwise in FIG. 2 and the fourth arm 10 is rotated in the reverse direction, whereby the diamond shape formed by the first arm 2, the half length of the second arm 4, the fourth arm 10 and the fifth arm 11 becomes short in the up-down direction. When the first motor 23 is further rotated so as to rotate the third arm 6 reversely, the first parallel link mechanism 16, the second parallel link mechanism 19, and the third parallel link mechanism 21 become largely tilted respectively and become low in the up-down direction. At this time, the up-down table 8 moves down vertically while keeping the horizontal state by setting the revolution ratio between the first speed reducer 24, the second speed reducer 26, and the third speed reducer 28 to 2:2:1.

As described above, according to the first embodiment, an industrial robot can be obtained in which a low lowest posture and a long up-down stroke can be realized due to the expanding and contracting mechanism of the first arm 2 to the fifth arm 11, enabling to save the installation space, and such rigidity that the predetermined positional accuracy can be ensured.

Embodiment 2

Figure 3:
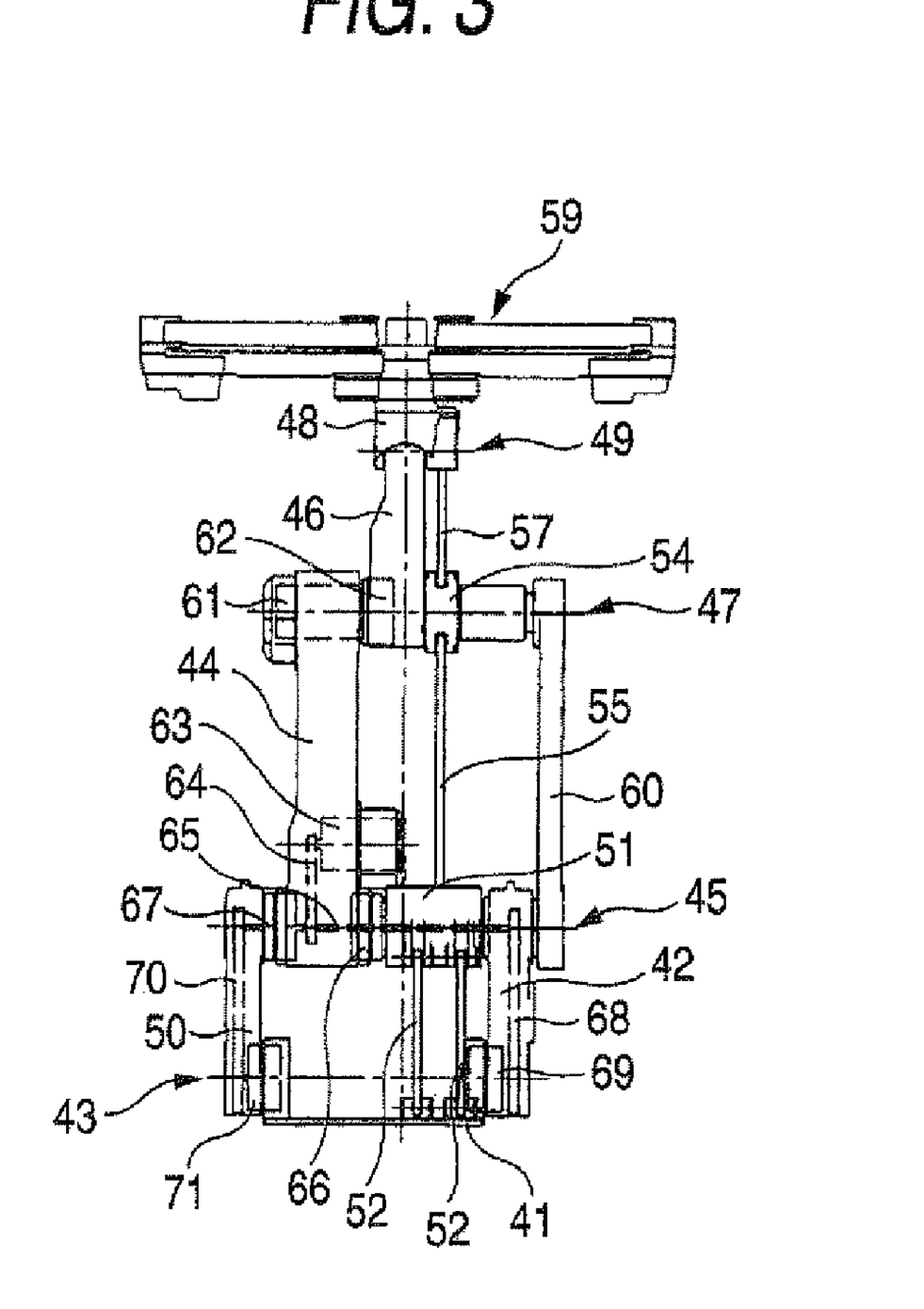
FIG. 3 It is a front view of an articulated robot showing a second embodiment of the invention.
Figure 4:
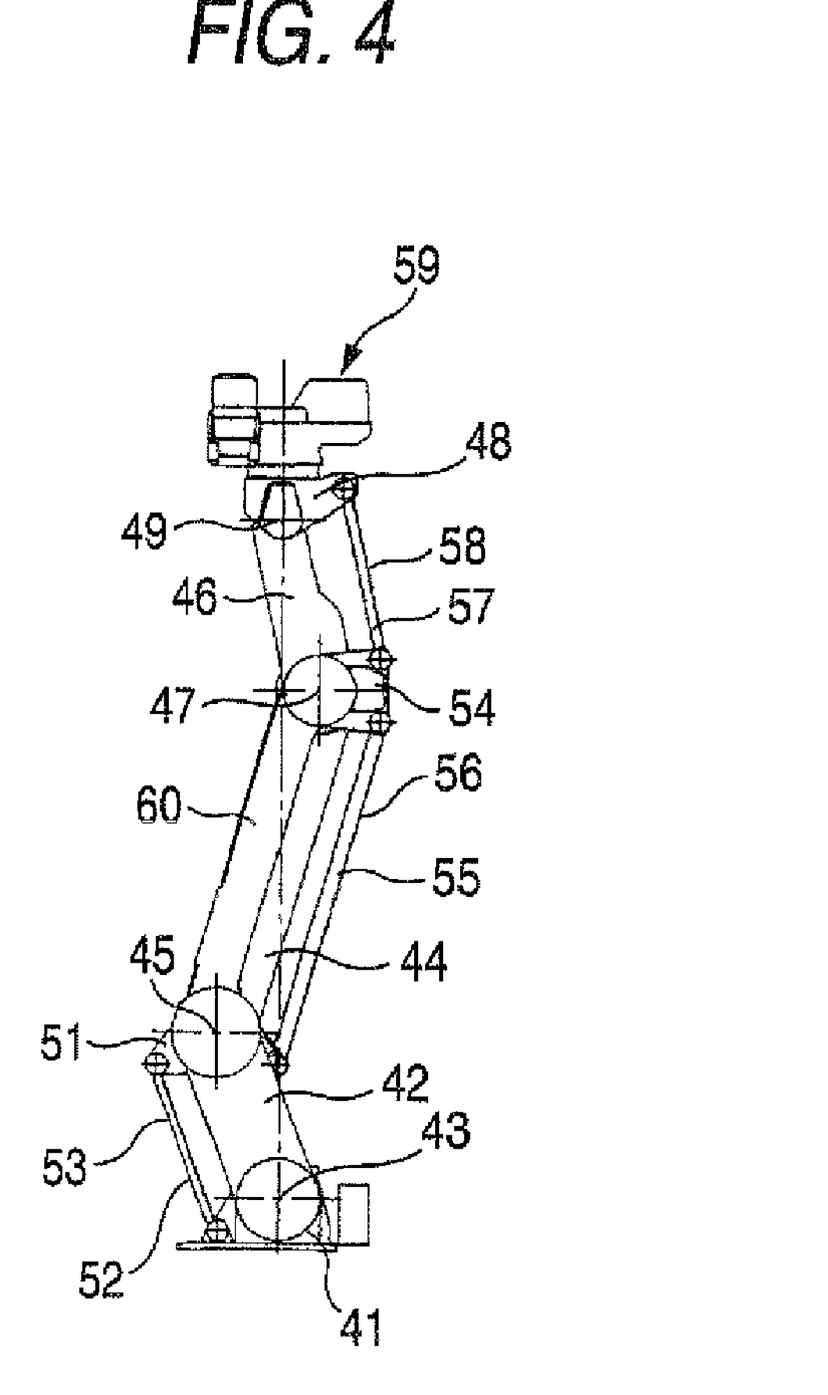
FIG. 4 It is a side view of the articulated robot showing the second embodiment of the invention.

FIGS. 3 and 4 are overall views of an articulated robot showing a second embodiment of the invention, in which FIG. 3 is a front view and FIG. 4 is a side view.

In both figures, 41 is a base of an articulated robot.

42 is a first arm which is supported by the base 41, and is attached so as to be rotatable about a first horizontal axis 43. 44 is a second arm which is supported by the leading end of the first arm 42, and is attached so as to be rotatable about a second horizontal axis 45. 46 is a third arm which is supported by the leading end of the second arm 44, and is attached so as to be rotatable about a third horizontal axis 47. 48 is an up-down table which is supported by the leading end of the third arm 46, and is attached so as to be rotatable about a forth horizontal axis 49. 50 is a fourth arm which is supported by the base 1, and is attached so as to be rotatable about the first horizontal axis 43. A leading end of the fourth arm 50 is supported by the second arm 44 and is attached so as to be rotatable about the second horizontal axis 45. The fourth arm 50 and the first arm 42 support the second arm 44 from respective sides.

51 is a first link base which is rotatably supported by the second horizontal axis 45, and 52 is a first auxiliary link, each end of which is rotatably supported by the base 41 and the first link base 51 respectively. The first auxiliary link 52 forms a first parallel link mechanism 53 with the first link base 51, the first arm 42, and the base 41.

54 is a second link base which is rotatably supported by the third horizontal axis 47, and 55 is a second auxiliary link, each end of which is rotatably supported by the first link base 51 and the second link base 54 respectively. The second auxiliary link 55 forms a second parallel link mechanism 56 with the second link base 54, the second arm 44, and the first link base 51.

57 is a third auxiliary link which is rotatably supported by the second link base 54 and the up-down table 48, and forms a third parallel link mechanism 58 with the up-down table 48, the third arm 46, and the second link base 54.

The attitude of the up-down table 48 is kept horizontal by the first parallel link mechanism 53, the second parallel link mechanism 56, and the third parallel link mechanism 58. 59 is a horizontal articulated mechanism attached onto the up-down table 48. Since the configuration and the function of the horizontal articulated mechanism 59 are the same as those in the first embodiment, their description will be omitted.

60 is an auxiliary arm, one end thereof is attached to the first arm 42 and is rotatable about the second horizontal axis 45, the other end thereof is pivotally supported by the third arm 46 and is rotatable about the third horizontal axis 47. The auxiliary arm 60 and the fourth arm 44 support the third arm 46 from respective sides. Further, the inside of the auxiliary arm 60 is hollow, and is used as a path for a cable extending from the base 41 to the up-down table 48.

61 is a first motor fixed to the upper portion of the second arm 44. The first motor 61 drives the third arm 46 via a first speed reducer 62 and rotates the third arm 46 relative to the second arm 44. 63 is a second motor fixed to the lower portion of the second arm 44. The power of the second motor 63 is transmitted to a shaft 65 via coupling means 64 (although a belt pulley mechanism is used here, a shaft and gears may be used in combination), and the shaft 65 couples to a second speed reducer 66 and a third speed reducer 67, whereby the second arm 44 is rotated relative to the first arm 42 and the fourth arm 50. The power of the shaft 65 rotates the first arm 42 relative to the base 41 via coupling means 68 (although a belt pulley mechanism is used here, a shaft and gears may be used in combination) provided in the first arm 42 and via a fourth speed reducer 69. Further, the power of the shaft 65 rotates the fourth arm 50 relative to the base 41 via coupling means 70 (although a belt pulley mechanism is used here, a shaft and gears may be used in combination) provided in the fourth arm 50 and via a fifth speed reducer 71.

The first motor 61 and the second motor 63 are operated by a not-shown control device independently or cooperatively. In this way, the first arm 42, the second arm 44, the third arm 46, and the fourth arm 50 rotate relatively, thereby moving the up-down table 48 up and down. At this time, similarly to the case in the first embodiment, the number of revolutions of the motors can be corrected by a not-shown control device.

Next, the up-down operation of the articulated robot according to the second embodiment will be described.

(Up-Operation)

The second motor 63 (FIG. 1) is rotated in the state shown in FIGS. 3 and 4, and is transmitted to the shaft 65 via the coupling means 64. The shaft 65 couples to the second speed reducer 66 and the third speed reducer 67 and rotates the second arm 44 counterclockwise in FIG. 4. The power of the shaft 65 further rotates the first arm 42 relative to the base 41 clockwise via the coupling means 68 provided in the first arm 42 and via the fourth speed reducer 69. Similarly, the power of the shaft 65 rotates the fourth arm 50 relative to the base 41 clockwise via the coupling means 70 provided in the fourth arm 50 and via the fifth speed reducer 71. As a result, the upper end of the second arm 44 moves up. When the first motor 61 is further rotates so as to drive the third arm 46 clockwise via the first speed reducer 62, the first parallel mechanism 53, the second parallel link mechanism 56, and the third parallel link mechanism 58 extend in the up-down direction respectively. At this time, the up-down table 48 moves up vertically while keeping the horizontal state by setting the revolution ratio between the first speed reducer 62, the second speed reducer 66, the third speed reducer 67, the fourth speed reducer 69, and the fifth speed reducer 71 to 2:2:2:1:1.

(Down-Operation)

The second motor 63 (FIG. 1) is rotated reversely in the state shown in FIGS. 3 and 4, and is transmitted via the coupling means 64 to the shaft 65. The shaft 65 couples to the second speed reducer 66 and the third speed reducer 67, and rotates the second arm 44 clockwise in FIG. 4. Further, the power of the shaft 65 rotates the first arm 42 relative to the base 41 counterclockwise via the coupling means 68 provided in the first arm 42 and via the fourth speed reducer 69. Similarly, the power of the shaft 65 rotates the fourth arm 50 relative to the base 41 counterclockwise via the coupling means 70 provided in the fourth arm 50 and via the fifth speed reducer 71. As a result, the upper end of the second arm 44 moves down. When the first motor 61 is further rotated reversely so as to drive the third arm 46 counterclockwise via the first speed reducer 62, the first parallel link mechanism 53, the second parallel link mechanism 56, and the third parallel link mechanism 58 become short in the up-down direction respectively. At this time, the up-down table 48 moves down vertically while keeping the horizontal state by setting the revolution ratio between the first speed reducer 62, the second speed reducer 66, the third speed reducer 67, the fourth speed reducer 69, and the fifth speed reducer 71 to 2:2:2:1:1.

According to the second embodiment, an industrial robot can be obtained, in which a low lowest posture and a long up-down stroke can be adopted due to the expanding and contracting mechanism configured by a combination of the first arm 42, the second arm 44, the third arm 46, and the fourth arm 50, and also due to the parallel link mechanism, enabling to save the installation space, and such rigidity that the predetermined positional accuracy can be ensured.

Figure 5A:
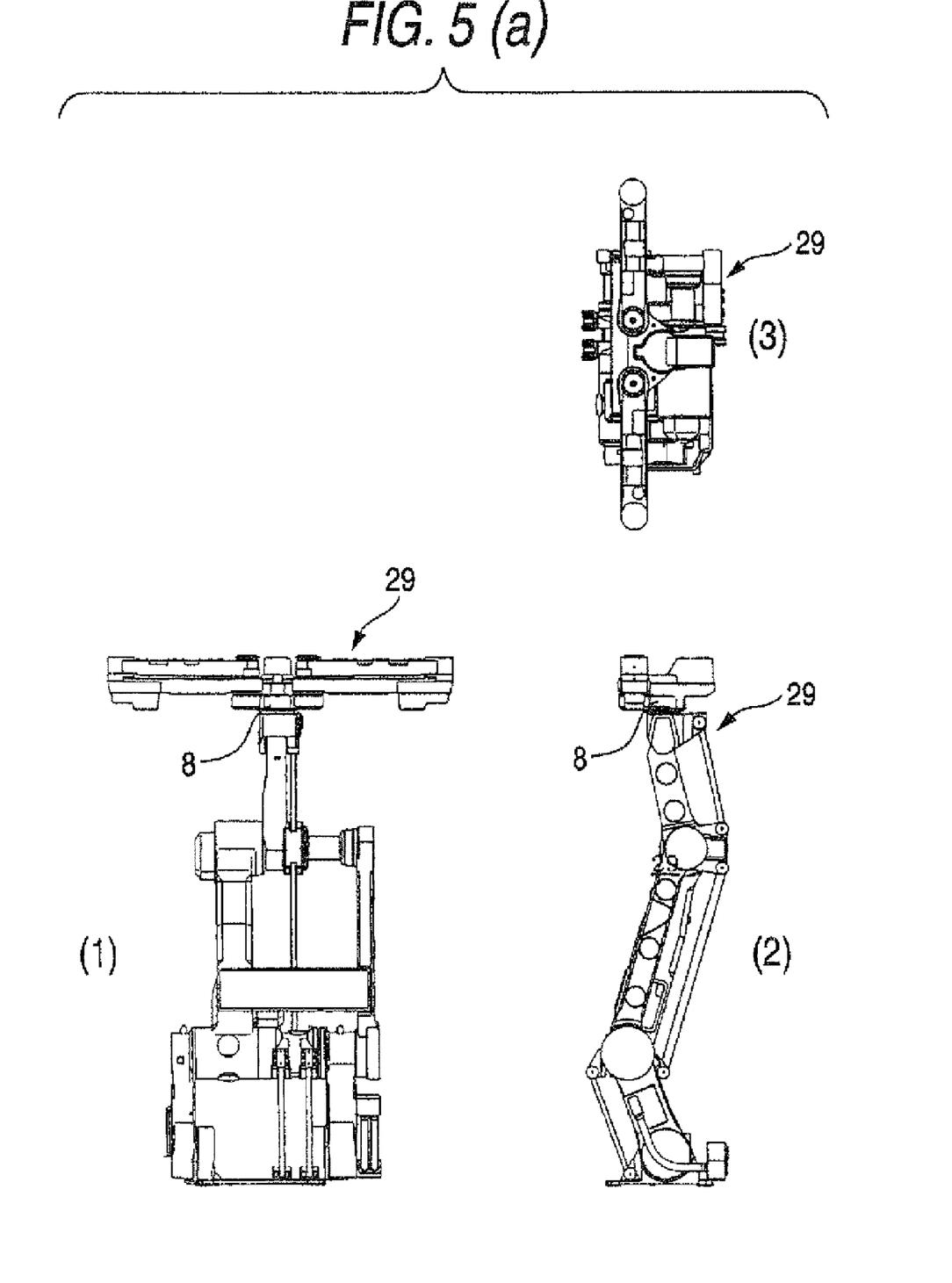
FIG. 5 It is an overall view showing a third embodiment of the invention, in which an articulated robot having a horizontal articulated mechanism is included.
Figure 5B:
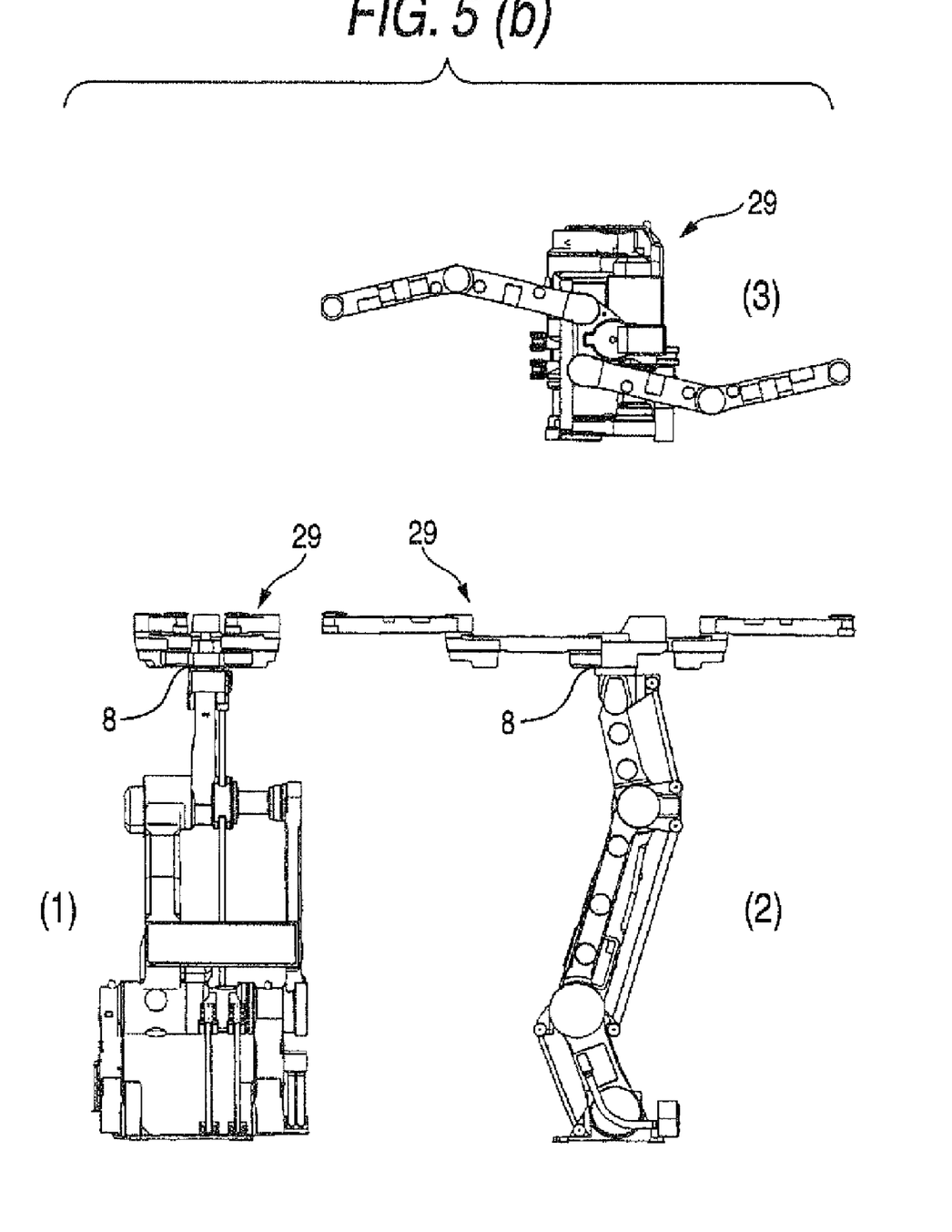
Figure 6:
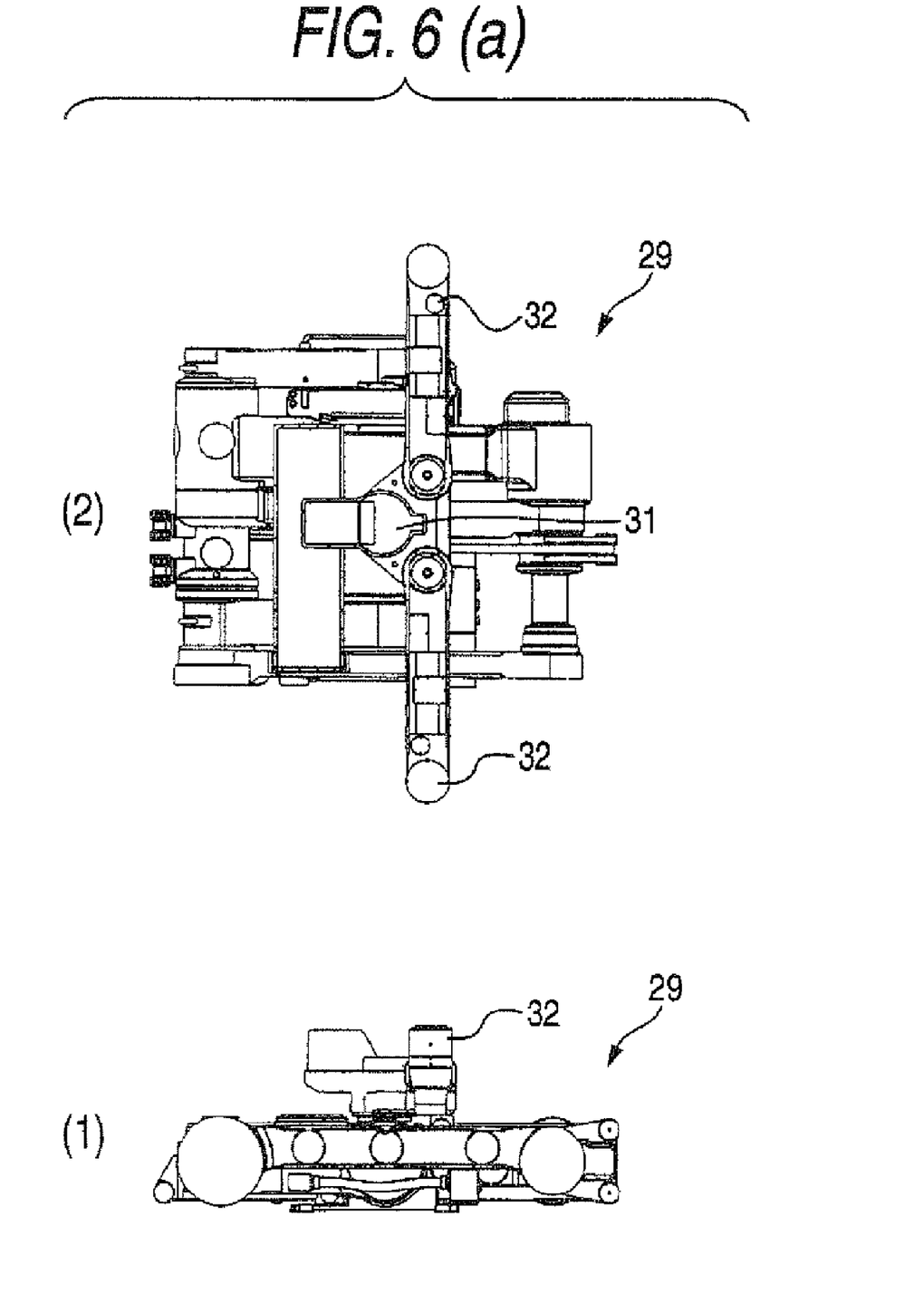
FIG. 6 It is an explanatory view of the horizontal articulated mechanism showing the third embodiment of the invention.

FIGS. 5 and 6 show a horizontal articulated mechanism in a third embodiment of the invention, in which FIG. 5 is an overall view including an articulated robot, and FIG. 6 is a diagram showing a lowest posture of the articulated robot for explaining the horizontal articulated mechanism. In the both figures, 29 is a horizontal articulated mechanism which attached onto an up-down table 8 (FIG. 2).

In FIG. 5, (a) shows a state where the horizontal articulated mechanism on the articulated robot is closed, and (b) shows a state where the horizontal articulated mechanism on the articulated robot is opened, and in each of (a) and (b), (1) is a front view, (2) is a side view, and (3) is a plan view.

In FIG. 6, (a) shows a state where the horizontal articulated mechanism 29 is closed, and (b) shows a state where the horizontal articulated mechanism 29 is opened, and in each of (a) and (b), (1) is a front view, and (2) is a side view.

The horizontal articulated mechanism 29 includes a rotary base 31 which rotates about a vertical axis 30 (FIG. 2), and two sets of horizontal arms 32 which are disposed side by side on the rotary base 31, and advance and retreat in the horizontal direction.

A not-shown hand is attached to a leading end of the horizontal arm 32, and a work to be conveyed is placed on the hand.

The articulated robot performs a conveying operation including the rotary and horizontal movements of the work to be conveyed by a rotation of the rotary base 31 and the expanding and contracting motions of two sets of horizontal arms 32.

Since the invention has the above configuration, actions and effects, it is useful as an articulated robot, particularly, as an articulated robot which realizes a long up-down stroke by a vertical articulated mechanism.

INDUSTRIAL APPLICABILITY

The invention is applied to an articulated robot, particularly to an articulated robot which realizes a long up-down stroke by a vertical articulated mechanism, and can be used in a field of manufacturing and providing an industrial robot which has a low lowest posture and a long up-down stroke, enabling to reduce installation space, and has such rigidity that the predetermined positional accuracy can be secured.

The invention claimed is:

1. An articulated robot comprising:
a base;
a first arm having one end supported by the base so as to be rotatable about a first horizontal axis;
a second arm having one end supported by the other end of the first arm so as to be rotatable about a second horizontal axis that is parallel to the first horizontal axis;
a third arm having one end supported by the other end of the second arm so as to be rotatable about a third horizontal axis that is parallel to the first horizontal axis;
an up-down table supported by the other end of the third arm so as to be rotatable about a fourth horizontal axis that is parallel to the first horizontal axis;
a fourth arm having one end supported by the base so as to be rotatable about the first horizontal axis;
a fifth arm having one end supported by the fourth arm so as to be rotatable about a fifth horizontal axis that is parallel to the first horizontal axis, and the other end supported by the second arm so as to be rotatable about a sixth horizontal axis that is parallel to the first horizontal axis;
a first link base which is rotatably supported by the second horizontal axis;
a second link base which is rotatably supported by the third horizontal axis;
a first auxiliary link which is rotatably supported by the base and the first link base, and forms a first parallel link mechanism with the first link base, the first arm and the base;
a second auxiliary link which is rotatably supported by the first link base and the second link base, and forms a second parallel link mechanism with the second link base, the second arm and the first link base; and
a third auxiliary link which is rotatably supported by the second link base and the up-down table, and forms a third parallel link mechanism together with the up-down table, the third arm and the second link base,
wherein a length ratio between the first arm, the second arm, the third arm, the fourth arm, and the fifth arm is 1:2:1:1:1, and
the sixth horizontal axis is disposed in a middle between the second horizontal axis and the third horizontal axis.

2. The articulated robot according to claim 1, further comprising:
a first motor attached to the second arm, the first motor rotating the third arm relative to the second arm via a first speed reducer; and
a second motor attached to the fourth arm, the second motor rotating the fifth arm relative to the fourth arm via a second speed reducer, and further rotating the fourth arm relative to the base via coupling means provided in the fourth arm and via a third speed reducer.

3. The articulated robot according to claim 1, further comprising an auxiliary arm having one end supported by the first arm so as to be rotatable about the second horizontal axis and the other end supported by the third arm so as to be rotatable about the third horizontal axis, wherein the auxiliary arm and the second arm support the third arm from respective sides.

4. The articulated robot according to claim 3, wherein the inside of the auxiliary arm is hollow so as to be a path of a cable.

5. The articulated robot according to claim 1, further comprising a horizontal articulated arm attached to the up-down table.

6. The articulated robot according to claim 1, further comprising two motors which are independently operable and are mounted along an up-down axis, and a control device which corrects the numbers of revolutions of the two motors with a previously set constant according to rigidity of the arms so that a cooperative operation of linearly moving up-down is made possible.

7. An articulated robot comprising:

a base;

a first arm having one end supported by the base so as to be rotatable about a first horizontal axis;

a second arm having one end supported by the other end of the first arm so as to be rotatable about a second horizontal axis that is parallel to the first horizontal axis;

a third arm having one end supported by the other end of the second arm so as to be rotatable about a third horizontal axis that is parallel to the first horizontal axis;

an up-down table supported by the other end of the third arm so as to be rotatable about a fourth horizontal axis that is parallel to the first horizontal axis;

a fourth arm having one end supported by the base so as to be rotatable about the first horizontal axis, the fourth arm and the first arm supporting the second arm from respective sides around the second horizontal axis;

a first link base which is rotatably supported by the second horizontal axis;

a second link base which is rotatably supported by the third horizontal axis;

a first auxiliary link which is rotatably supported by the base and the first link base, and forms a first parallel link mechanism with the first link base, the first arm and the base;

a second auxiliary link which is rotatably supported by the first link base and the second link base, and forms a second parallel link mechanism with the second link base, the second arm and the first link base; and a third auxiliary link which is rotatably supported by the second link base and the up-down table, and forms a third parallel link mechanism with the up-down table, the third arm and the second link base; and an auxiliary arm having one end supported by the first arm so as to be rotatable about the second horizontal axis and the other end supported by the third arm so as to be rotatable about the third horizontal axis, wherein the auxiliary arm and the second arm support the third arm from respective sides, wherein a length ratio between the first arm, the second arm, the third arm, the fourth arm and the auxiliary arm is 1:2:1:1:2.

8. The articulated robot according to claim 7, further comprising a first motor and a second motor attached to the second arm, wherein the first motor rotates the second arm relative to the first arm via a first speed reducer, rotates the second arm relative to the fourth arm via a second speed reducer, rotates the first arm relative to the base via a first coupling unit provided in the first arm and via a third speed reducer, and rotates the fourth arm relative to the base via a second coupling unit provided in the fourth arm and via a fourth speed reducer, and the second motor rotates the third arm relative to the second arm via a fifth speed reducer.

9. The articulated robot according to claim 7, wherein an inside of the auxiliary arm is hollow so as to be a path of a cable.

10. The articulated robot according to claim 7, further comprising a horizontal articulated arm attached to the up-down table.

11. The articulated robot according to claim 7, further comprising two motors which are independently operable and are mounted along an up-down axis, and a control device which corrects the numbers of revolutions of the two motors with a previously set constant according to rigidity of the arms so that a cooperative operation of linearly moving up-down is made possible.

* * * * *